United States Patent
Zhong et al.

(10) Patent No.: US 11,885,872 B2
(45) Date of Patent: *Jan. 30, 2024

(54) SYSTEM AND METHOD FOR CAMERA RADAR FUSION

(71) Applicant: Texas Instruments Incorporated, Dallas, TX (US)

(72) Inventors: Ziguo Zhong, Allen, TX (US); Liu Hui-che, Murphy, TX (US)

(73) Assignee: Texas Instruments Incorporated, Dallas, TX (US)

(*) Notice: Subject to any disclaimer, the term of this patent is extended or adjusted under 35 U.S.C. 154(b) by 449 days.

This patent is subject to a terminal disclaimer.

(21) Appl. No.: 17/080,875

(22) Filed: Oct. 27, 2020

(65) Prior Publication Data

US 2021/0041555 A1 Feb. 11, 2021

Related U.S. Application Data

(63) Continuation of application No. 15/891,867, filed on Feb. 8, 2018, now Pat. No. 10,852,419.

(Continued)

(51) Int. Cl.
*G01S 13/86* (2006.01)
*G01S 13/931* (2020.01)
(Continued)

(52) U.S. Cl.
CPC .............. *G01S 13/867* (2013.01); *B60R 1/00* (2013.01); *B60R 11/04* (2013.01); *G01S 13/584* (2013.01);
(Continued)

(58) Field of Classification Search
CPC ...... G01S 13/87; G01S 13/931; G01S 13/867; G01S 13/89; G01S 13/86; G01S 13/865;
(Continued)

(56) References Cited

U.S. PATENT DOCUMENTS 10,852,419 B2 * 12/2020 Zhong ..................... B60R 1/00
2010/0253596 A1 10/2010 Szczerba
(Continued)

OTHER PUBLICATIONS

NHTSA, "U.S. Department of Transportation Releases Policy on Automated Vehicle Development", NHTSA.org, May 2013.
(Continued)

*Primary Examiner* — Olumide Ajibade Akonai
(74) *Attorney, Agent, or Firm* — Carl G. Peterson; Frank D. Cimino

(57) ABSTRACT

A method for camera radar fusion includes receiving, by the processor, radar object detection data for an object and modeling, by a processor, a three dimensional (3D) physical space kinematic model, including updating 3D coordinates of the object, to generate updated 3D coordinates of the object, in response to receiving the radar object detection data for the object. The method also includes transforming, by the processor, the updated 3D coordinates of the object to updated two dimensional (2D) coordinates of the object, based on a 2D-3D calibrated mapping table and modeling, by the processor, a two dimensional (2D) image plane kinematic model, while modeling the 3D physical space kinematic model, where modeling the 2D image plane kinematic model includes updating coordinates of the object based on the updated 2D coordinates of the object.

19 Claims, 7 Drawing Sheets

Related U.S. Application Data

(60) Provisional application No. 62/575,269, filed on Oct. 20, 2017.

(51) Int. Cl.

| | | |
|---|---|---|
| *B60R 11/04* | (2006.01) | |
| *G01S 13/58* | (2006.01) | |
| *B60R 1/00* | (2022.01) | |
| *G06V 20/58* | (2022.01) | |
| *G06V 20/64* | (2022.01) | |
| *G06F 18/25* | (2023.01) | |
| *G06V 10/80* | (2022.01) | |
| *G01S 13/89* | (2006.01) | |
| *G01S 17/89* | (2020.01) | |

(52) U.S. Cl.
CPC .......... *G01S 13/931* (2013.01); *G06F 18/253* (2023.01); *G06V 10/806* (2022.01); *G06V 20/58* (2022.01); *G06V 20/647* (2022.01); *B60R 2300/301* (2013.01); *G01S 13/89* (2013.01); *G01S 17/89* (2013.01)

(58) Field of Classification Search
CPC ........... G01S 13/42; G01S 2013/93271; G01S 7/4972; G01S 17/89; G01S 17/931; G01S 7/417; G01S 13/726; G01S 7/497; G01S 17/87; G01S 7/40; G05D 1/0257; G06N 20/00; G06N 3/08; G06N 3/045; G06N 3/02; G06T 7/20; G06T 2207/10044; G06T 2207/20221; G06V 10/82; G06V 20/56; G06V 20/647; G06V 2201/07; B60W 2420/52

See application file for complete search history.

(56) References Cited

U.S. PATENT DOCUMENTS

| | | |
|---|---|---|
| 2010/0253597 A1 | 10/2010 | Seder |
| 2015/0346727 A1 | 12/2015 | Ramanujam |
| 2016/0014395 A1 | 1/2016 | Murray |
| 2016/0109566 A1 | 4/2016 | Liu |
| 2016/0349365 A1 | 12/2016 | Ling |
| 2017/0307735 A1 | 10/2017 | Rohani |
| 2017/0345321 A1 | 11/2017 | Cross |
| 2018/0174038 A1 | 6/2018 | Jiang |
| 2019/0120934 A1 | 4/2019 | Slutsky |

OTHER PUBLICATIONS

ERTRAC, "Automated Driving Roadmap", v. 5.0, Jul. 2015.
J. Laneurit, et al., "Multisensorial Data Fusion for Global Vehicle and Obstacles Absolute Positioning", IEEE IVS, 2003.
N. Shima, et al., "Fusion Sensor for Driving Assistance System", Fujitsu Tech. Journal. No. 17, 2001.
F. Melzer, "Towards Autonomous Driving", Autoliv CMD'15.
L. Scharf, "Statistical Signal Processing: Detection, Estimation, and Time Series Analysis", Addison Wesley, NY. https://en.wikipedia.org/wiki/Statistical_signal_processinghttps://en.wikipedia.org/wiki/Statistical_signal_processing.
J. Shi and J. Malik, "Normalized Cuts and Image Segmentation", IEEE Transactions on PAMI, 22(8), Aug. 2000.
N. Dalal and B. Triggs, "Histograms of Oriented Gradients for Human Detection", CVPR 2015.

\* cited by examiner

SYSTEM AND METHOD FOR CAMERA RADAR FUSION

CROSS-REFERENCE TO RELATED APPLICATION

This application is a continuation of U.S. Non-Provisional patent application Ser. No. 15/891,867, filed on Feb. 8, 2018, which claims priority to U.S. Provisional Patent Application No. 62/575,269, filed on Oct. 20, 2017, and entitled "Camera Radar Fusion for Reliability in Advanced Driver Assistance System," both of which are hereby incorporated by reference in their entireties herein.

FIELD OF THE INVENTION

The present disclosure relates to a system and method for camera and radar sensing, and in particular, to a system and method for camera radar fusion.

BACKGROUND OF THE INVENTION

Driven by advanced safety features, the automotive industry is increasing the number and variety of sensors deployed in automobile, as well as the corresponding computational capacity in automotive systems. In many applications, such as collision warning and avoidance, adaptive cruise control, lane keeping, and autonomous parking, accurately perceiving the surroundings in a real-time manner is necessary for decision making and actuation. It is desirable for vehicle sensor systems to function well in a variety of situations. Two types of sensors which may be deployed in automobiles are video sensors and radar sensors.

SUMMARY OF THE INVENTION

An embodiment method for camera radar fusion includes receiving, by the processor, radar object detection data for an object and modeling, by a processor, a three dimensional (3D) physical space kinematic model, including updating 3D coordinates of the object, to generate updated 3D coordinates of the object, in response to receiving the radar object detection data for the object. The method also includes transforming, by the processor, the updated 3D coordinates of the object to updated two dimensional (2D) coordinates of the object, based on a 2D-3D calibrated mapping table and modeling, by the processor, a two dimensional (2D) image plane kinematic model, while modeling the 3D physical space kinematic model, where modeling the 2D image plane kinematic model includes updating coordinates of the object based on the updated 2D coordinates of the object.

Another embodiment method for camera radar fusion includes receiving, by a processor, a vision motion estimation vector for an object and receiving, by the processor, visual object classification data for the object, the visual object classification data obtained by a video camera. The method also includes receiving, by the processor, radar object detection data for the object and determining, by the processor, a two dimensional (2D) position of the object based on the vision motion estimation vector and based on the visual object classification data. Additionally, the method includes determining, by the processor, a 2D velocity of the object based on the visual motion estimation vector and based on the visual object classification data and determining, by the processor, a three dimensional (3D) position of the object based on the radar object detection data. Also, the method includes determining, by the processor, a 3D velocity of the object based on the 2D position of the object, the 2D velocity of the object, a focal length of the video camera, and the 3D position of the object.

An embodiment system-on-a-chip (SoC) includes one or more processors coupled to a video camera and to a radar sensor. The one or more processors are configured to receive, from the video camera, video data receive, from the radar sensor, radar data. The one or more processors are also configured to perform image processing, filtering, and object classification and tracking based on the video data, to generate visual object classification data and perform visual motion estimation on the video data, to generate a vision motion estimation vector. Additionally, the one or more processors are configured to perform radar signal processing on the radar data, to generate processed radar object detection data and perform camera radar alignment on the radar data, to generate aligned radar object detection data. Also, the one or more processors are configured to perform camera radar fusion on the aligned radar object detection data, the vision motion estimation vector, and the visual object classification data, to generate camera radar fusion data.

BRIEF DESCRIPTION OF DRAWINGS

For a more complete understanding of the present disclosure, and the advantages thereof, reference is now made to the following descriptions taken in conjunction with the accompanying drawings, in which.

DETAILED DESCRIPTION OF EXAMPLE EMBODIMENTS

Figure 1:
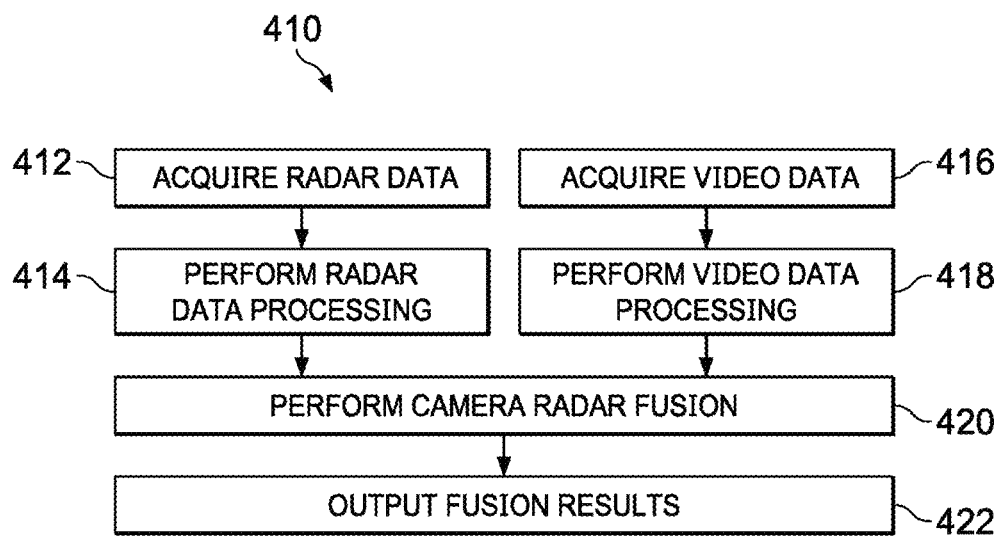
FIG. 1 illustrates a flowchart for an example method of camera radar fusion.

Two types of sensors which may be deployed in automobiles are video sensors and radar sensors. Video sensors are passive sensors that obtain data using video cameras. Video cameras are well suited for detecting angles, boundaries of objects, and object classification. Additionally, video cameras are somewhat well suited for detecting distance, lateral velocity of objects, and obstacle detection. However, video cameras are poorly suited for detecting radial velocity and accuracy in variable environmental conditions, such as variable weather, such as rain, snow, and fog, lighting conditions, such as nighttime or glaring lighting conditions, and dirt on the camera lens.

In contrast, radar sensors, which are active sensors, are well suited for detecting distance, radial velocity, obstacle detection, and accuracy in variable environmental conditions. Additionally, radar sensors are somewhat suited for detecting angles and object classification. However, radar sensors are poorly suited for detecting lateral velocity and for boundary detection.

An embodiment performs camera radar fusion to improve sensing compared to separate camera and radar sensing, by utilizing the complementary strengths and weaknesses of camera and radar sensing. For example, video cameras have fair performance at lateral velocity detection and radar has poor performance at lateral velocity detection. However, a system utilizing camera radar fusion has excellent lateral velocity detection. Performing camera radar fusion increases observational accuracy, improving reliability and safety in automotive systems. Data from separate sensors that excel at different tasks may be matched, verified, and fused to achieve improved accuracy and reliability.

Sensor fusion may improve detection of in-field objects, such as objects, targets, or obstacles, by integrating outputs from radar sensors and video cameras. An embodiment camera radar fusion system maintains sensor results simultaneously in both a two dimensional (2D) plane and a three dimensional (3D) plane, utilizing data from both a video camera and a radar sensor. The 2D and 3D planes are simultaneously modeled, and these models are coupled together. The use of simultaneous 2D and 3D modeling may enable processing and optimization in both 3D space and 2D space by leveraging tools in each domain to improve accuracy and reliability of the system.

3D velocity estimation is useful in performing effective tracking of objects. However, direct measurement of 3D velocity from either radar sensors or video cameras alone gives partial information on the 3D velocity of the object. Example camera radar fusion systems provide joint 3D position and velocity estimation using video camera and radar sensors. Using joint 3D position and velocity estimation may improve accuracy and reduce overhead.

In an embodiment camera radar fusion system, data and computations are labeled with timestamps. These timestamps are used to order the data. Additionally, the timestamps may be used for aging the kinematic model.

In performing camera radar fusion, it is desirable that sensing results and messages are processed in a time synchronized manner. In a camera radar fusion system, sensors may operate in a coordinated manner, or they may operate in an uncoordinated manner. Sensor data processing may utilize diverse features, which may involve dynamic delays, depending on the sensor type, pre-processing algorithms, buffering schemes, inter-processor communication, and scheduling constraints from the framework software. This may lead to temporal misalignment of sequences of data at the input to the camera radar fusion block, which may cause unpredictable errors. The frames may arrive out of order, or with an unreasonable delay. Dynamically scheduling threads in a complex system, such as a camera radar fusion system, may lead to random delays and dynamic processing sequences. For example, different sensors may operate in an uncoordinated manner, and involve different processing and/or data transmission delays. An embodiment camera radar fusion system performs fully timestamped data flow with kinematic model aging to achieve time synchronization of video and radar data.

In an embodiment camera radar fusion system, input into the camera radar fusion block contains a timestamp indicating the time instance of the source data capture from the corresponding sensor. In a distributed system where sensors and pre-processors operate with unsynchronized local clocks, a synchronization algorithm translates local timestamps to corresponding global timestamps by modeling the frequency difference and reading offsets between individual local clock readings and the global system time reference visible to the camera radar fusion block.

In the kinematic model for time aware camera radar fusion processing, the states of object tracking are timestamped, and inputs are time-gated. The timestamp associated with the kinematic model of an individual object is updated in response to a new input, when the timestamp associated with the new input is more recent than the timestamp for the kinematic model. When the timestamp associated with the new input is older than that of the kinematic model, out-of-order sensor inputs are detected. In one embodiment, outdated inputs are discarded. In other embodiments, the camera radar fusion model may buffer recent inputs and ensure the correctness of the kinematic model by enforcing temporally coherent integration processing. Lagging data may be inserted into the appropriate time in the kinematic model.

Additionally, a model aging scheme and the use of timestamped source data ensures that expired sensing results and out-of-order messages arriving at the fusion block do not lead to erroneous model propagation. The data and pre-processing results obtained from the sensors are timestamped, leading to global time synchronization among sensors and distributed processing units. Information and data is arranged in timestamp order. With timestamped data flow, object models are processed with an aging mechanism, in which the uncertainty associated with estimated kinematic models degrade proportionally to the elapsed time. The elapsed time is the interval between the current time and the time instance of the latest acquisition for data and most recent processing.

An embodiment camera radar fusion system performs calibration, for example sensor calibration and/or system calibration. Sensor calibration involves obtaining and/or adjusting the parameter profile of individual sensors, so the sensors operate as expected, meeting performance requirements. Different types of sensors use different calibration methods. For example, video cameras are calibrated using standard color charts for photometric parameters and corner or edge feature charts for geometric parameters. On the other hand, radar sensors are calibrated for phase offsets among different transmission and reception channels.

In system calibration for a camera radar fusion system, the relative geometric relationship among the different sensors, for example in the form of transformation matrixes, is determined. This calibration is performed so sensing results feeding into the fusion block may be integrated in a unified geometric coordinate system.

In an embodiment system, data from both a video camera and a radar sensor is modeled as point objects associated with a particular field of view, as a solid angle originating from the point. Calibration may determine the three dimensional coordinates of the sensor point in a pre-defined global framework, for example a coordinate system defined for the vehicle body. Additionally, the system calibration may involve two pointing vectors defining the orientation of the sensor field of the view in three dimensional space.

In one embodiment, system calibration for the video camera and the radar sensor are performed independently. For the video camera, feature charts with known geometric patterns, such as locations and orientations, are placed in view of the video camera. Additionally, for the radar sensor, metal corner reflectors with known geometric parameters, such as location and orientation, are placed in the field of view for the radar sensor. The six dimensional parameters of both sensors, including a three dimensional point of three unknown parameters and two pointing vectors with three unknown parameters, are obtained by solving an optimization problem after collecting observations from at least three non-collinear calibration reference points.

FIG. 1 illustrates the flowchart 410 for an embodiment method of performing camera radar fusion. In the block 412, the camera radar fusion system acquires radar data using a radar sensor. Radar data may be acquired using a radar sensor, such as a millimeter (mm) wave sensor. The radar sensor emits radar waves, which are reflected from objects back to the radar sensor. In one embodiment, an integrated single-chip frequency-modulated continuous wave (FMCW) radar sensor is used. A timestamp may be added to the radar data at the time of acquisition.

Then, in the block 414, the camera radar fusion system performs radar data processing on the radar data acquired in the block 412. Radar signal processing, for example, range fast Fourier transform (FFT), Doppler FFT, constant false alarm rate (CFAR) detection, direction of arrival (DOA) estimation, region of interest (ROI) clustering, and object tracking is performed. Radar object detection data is produced. Additionally, the camera radar fusion system performs camera radar alignment, for example using image plane mapping. A timestamp may be associated with the processed radar data.

Meanwhile, in the block 416, the camera radar fusion system acquires video data using a video camera. One or more video cameras, each having at least one video sensor, obtain video data. Examples of video sensors include charge-coupled device (CCD) sensors and complementary metal-oxide semiconductor (CMOS) video sensors. A timestamp may be associated with the acquired sensor data at the time of acquisition. In one embodiment, the video camera detects brightness only. In other embodiments, the video camera performs color detection.

Next, in the block 418, the camera radar fusion system performs video data processing on the video data acquired in the block 416. The video processing may include vision motion estimation, image processing, and object recognition. In an example, vision motion estimation includes Gaussian image pyramid generation, motion visualization, Harris feature extraction, point of interest (POI) selection, and Lucas-Kanade (LK) motion estimation. Examples of image processing include demosaicing, lens distortion correction, gamma correction, white balancing, noise filtering, and resizing and feature plane extraction. Additionally, object recognition may include object classification and object tracking. Timestamps are associated with the video data as it is processed.

In the block 420, the camera radar fusion system performs camera radar fusion (CRF) on the radar data processed in the block 412 and on the video data processed in the block 418. Camera radar fusion includes 3D velocity synthesis and simultaneous 2D and 3D tracking. The timestamps for the data may be used for synchronization.

In the block 422, the camera radar fusion system outputs the fusion results obtained in the block 420. Fusion visualization, such as radar drawing, fusion drawing, and real-time system-on-a-chip (SoC) loading may be performed. The results may be output on a visual screen using a display driver. Alternatively or additionally, the results may be directly used by another function in an advanced driving assistant system (ADAS).

Figure 2:
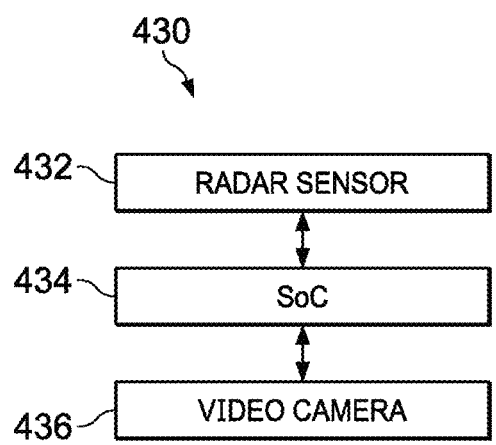
FIG. 2 illustrates an example camera radar fusion system.

FIG. 2 illustrates the camera radar fusion system 430, which contains the SoC 434 coupled to the radar sensor 432 and to the video camera 436. The SoC 434 contains multiple processors, for example at least one general purpose processor for high level algorithm execution, such as a reduced instruction set computer (RISC) processor, such as an advanced RISC machine (ARM), a digital signal processor (DSP), or a general purpose (GP) processor, at least one mid-level processor, such as a DSP, an embedded vision engine (EVE), or a graphics processing unit (GPU), and at least one lower level processor, such as a hardware accelerator (HAC), along with a variety of peripherals. The SoC 434 performs image data processing, radar data processing, and camera radar fusion on the radar data from the radar sensor 432 and on the video data from the video camera 436.

The radar sensor 432 may be a CMOS radar module, which may contain the full signal chain from radio frequency (RF) to an analog-to-digital converter (ADC). The radar sensor 432 may also be known as an mmWave chip. The radar sensor 432 emits radar beams and receives reflections of the emitted radar beams off of objects. Then, the radar sensor 432 performs preliminary processing on the received radar data.

The video camera 436 is a video sensor with an accompanying lens. The video camera 436 may include a CMOS video sensor or a CCD video sensor. The video camera 436 passively receives video data, and transmits the video data to the SoC 434.

Figure 3:
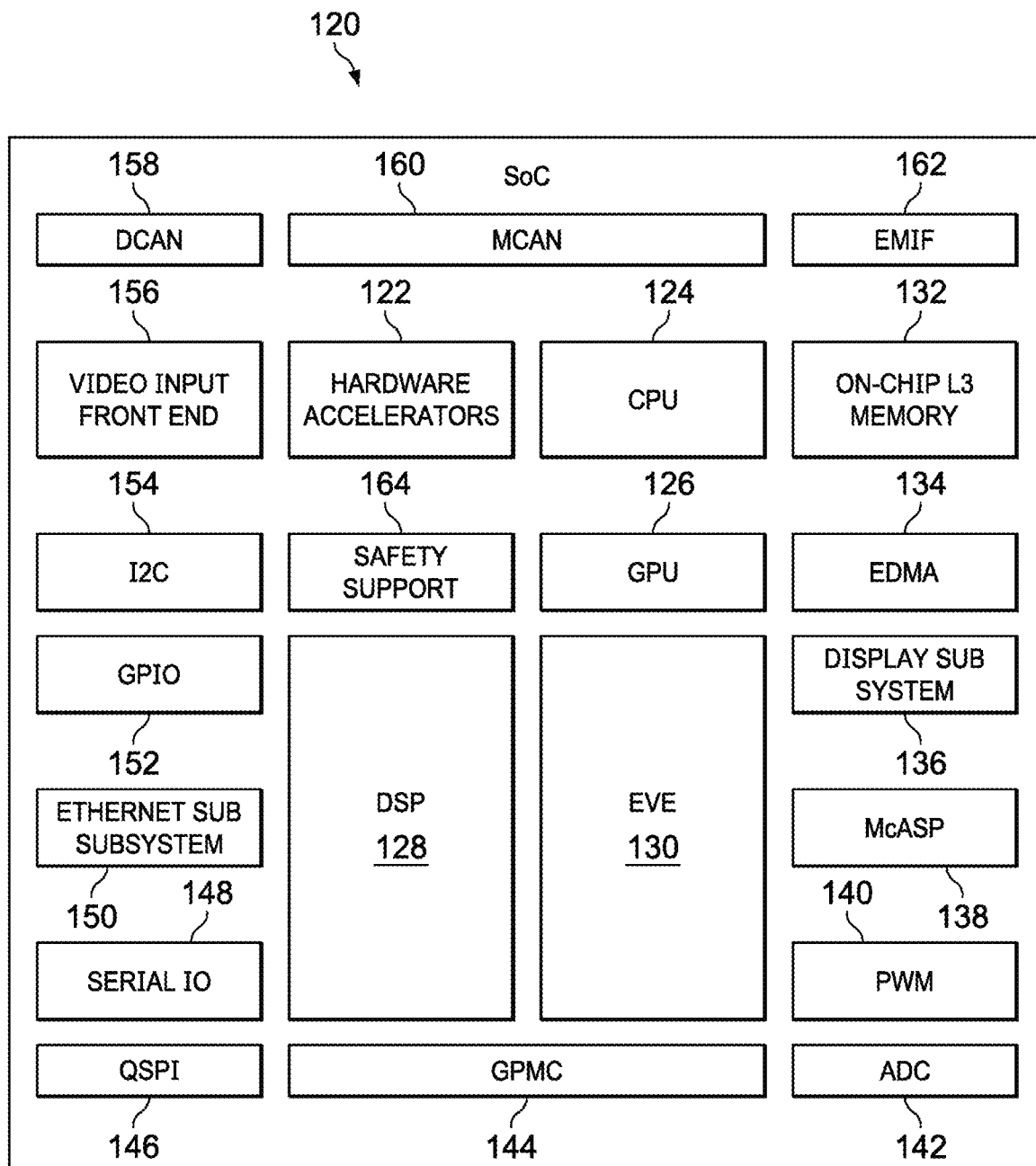
FIG. 3 illustrates an example system-on-a-chip (SoC) for camera radar fusion.

FIG. 3 illustrates the SoC 120 which may be used in a camera radar fusion system, for example as the SoC 434 in the camera radar fusion system 430. In a SoC, such as the SoC 120, the diverse processors are well suited for different functions for camera radar fusion. In an embodiment, the SoC 120 is a TDAx™ processor chip made by Texas Instruments. In other embodiments, a different SoC chip, or more than one chip, are used. The SoC 120 includes multiple processing chips operating at different processing levels. The hardware accelerators 122, for example an image signal processor (ISP) and a video processing engine (VPE), are hardware accelerators featuring a high bandwidth. Hardware accelerators may refer to low level processors with a high bandwidth for performing simple computations. The hardware accelerators 122 are functionally fixed, but configurable. In a camera radar fusion system, the hardware accelerators 122 may be used to perform image signal processing, filtering, gradients, morphological operations, and convolution neural networks (CNN). In other embodiments, a different hardware accelerator or other low level processing chip may be used for low level processing.

The central processing unit (CPU) 124 performs high level processing in the SoC 120. The CPU 124, for example an ARM processor, which is easily programmed, performs high level processing. Also, the CPU 124 includes memory coherency. In a camera radar fusion system, the CPU 124 may perform object detection and tracking, CNN processing, adaptive boosting (AdaBoost), support vector machine (SVM) processing, k-nearest neighbor (KNN) processing, and artificial neural network (ANN) processing. In other embodiments, other chips, such as DSP chips or GP processors perform these high level functions.

The SoC 120 includes a variety of mid-level processors, including the GPU 126, the DSP 128, and the EVE 130. Other mid-level processor configurations may also be used. For example, a single type of mid-level processor may be used. The mid-level processors have a high bandwidth. Also, the mid-level processors may be single instruction multiple data (SIMD) processors, very long instruction word (VLIW) processors, or application programming interface (API) or kernel processors. The mid-level processors perform functions such as optical flow, stitching, integral image, disparity, corner detection, edge detection, and feature extraction. Examples of feature extraction include speeded up robust features (SURF), histogram of oriented gradients (HOG), oriented features from accelerated segment test (FAST) and rotated binary robust independent elementary features (BRIEF) (ORB), or other feature extraction methods, such as shape based image processing and curve detection.

Additionally, the SoC 120 includes the safety support chip 164, which may be a safety island. The safety support chip 164 ensures proper operation of the SoC 120 in case of a failure. For example, the safety support chip 164 ensures that a failure is reported, and assists in recovery from a failure. For example, when one component fails, the safety support chip 164 ensures that other components continue to run properly.

The SoC 120 includes on-chip memory and memory access controllers, such as the on-chip level three (L3) memory 132 and the enhanced direct memory access (EDMA) 134. The EDMA 134 enables hardware subsystem to access the on-chip L3 memory 132 directly. In one embodiment, the on-chip L3 memory is a type of cache. The on-chip L3 cache is shared by the processors, including the hardware accelerators 122, the CPU 124, the GPU 126, the DSP 128, and the EVE 130. The on-chip L3 memory 132 may contain random access memory (RAM). In other examples, different types of memory, for example L4 cache, are used.

The SoC 120 includes a variety of peripherals. The SoC 120 includes controller area network (CAN) buses, such as the data controller area network (DCAN) bus 158 and the Motorola™ controller area network (MCAN) 160. Additionally, the SoC 120 includes other busses, such as the external memory interface (EMIF) 162. The buses are used to enable the microcontrollers and devices to communicate with each other. Additionally, the SoC 120 contains the video input front end 156, which may be camera serial interface 2 (CSI2) or camera parallel interface (CPI).

Additionally, the SoC 120 includes a variety of other peripherals. For example, the SoC 120 includes an inter-integrated circuit (I²C) bus 154, a general-purpose input/output (GPIO) 152, and an Ethernet sub-system 150, which may be a gigabit Ethernet (GbE) switch. Also, the SoC 120 includes a serial input/output (IO) 148, which may be a universal asynchronous receiver-transmitter (UART) or a serial peripheral interface (SPI) bus. The SoC 120 may also include a queued serial peripheral interface (QSPI) 146, a group policy management console (GPMC) 144, and an ADC 142, which may be an eight channel 10 bit ADC. Other peripherals in the SoC 120 may include a display sub system 136, which may include a display pixel interface (DPI) and a standard definition digital-to analog (SD-DAC) converter, a multichannel audio serial port (McASP) block 138, and a pulse width modulation (PWM) block 140. In other embodiments, additional peripherals are used.

Figure 4:
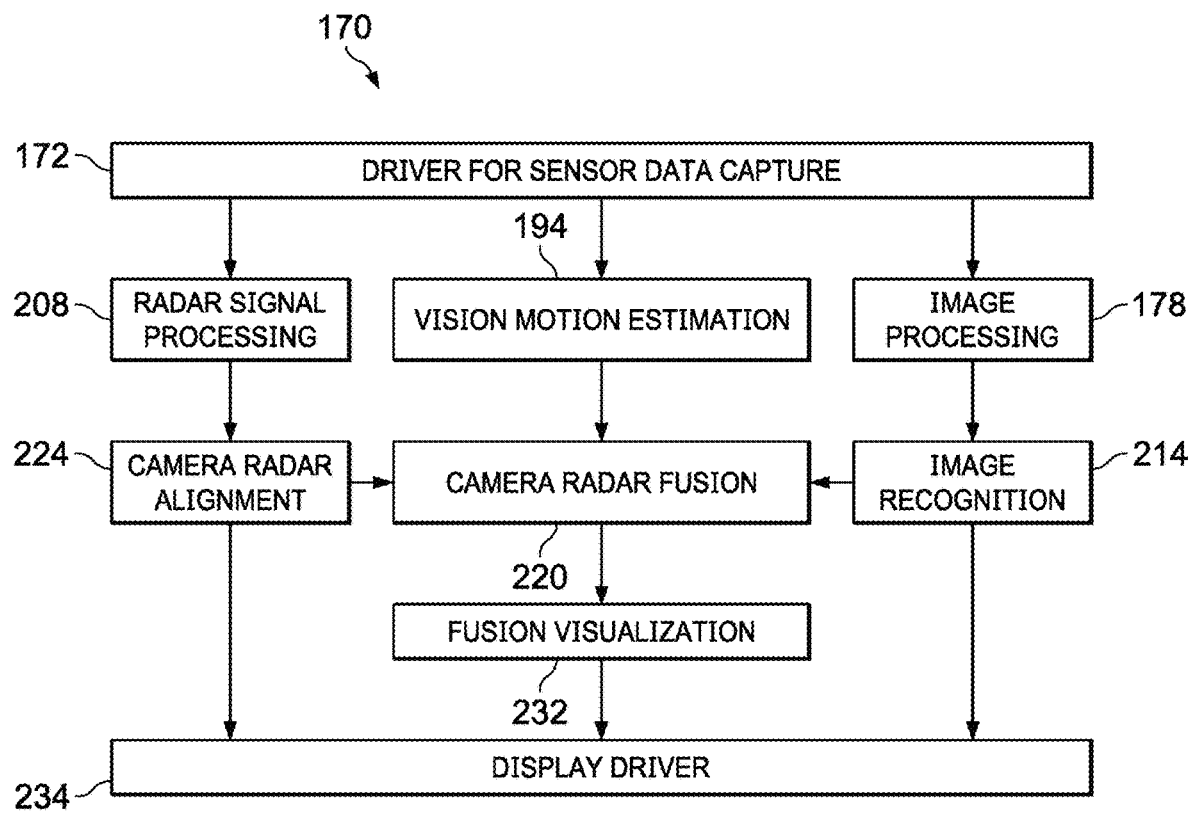
FIG. 4 illustrates a flowchart for another example method of camera radar fusion.

FIG. 4 illustrates the flowchart 170 for an embodiment method of performing camera radar fusion. In the block 172, a processor performs a driver for sensor data capture. In an embodiment the processor is an image processing unit (IPU), for example an MPU, an ARM, or another processor type. The IPU obtains sensor data from the radio sensor and from the video camera. Radar data is output to the block 208 for radar signal processing, and video data is output to the block 178 for image processing and to the block 194 for vision motion estimation.

The block 208 performs various aspects of radar signal processing on the radar data, including computing the range FFT, computing the Doppler FFT, performing CFAR detection, performing DOA estimation, performing ROI clustering, and performing object tracking. Radar object detection data is produced. In one embodiment, the block 208 is performed by a DSP.

The processed radar object detection data is output to the block 224 for camera radar alignment, for example image plane mapping. In one embodiment the block 224 is performed by the same DSP as the block 208. The radar data is mapped onto the 2D image plane to be combined with the image data. The radar data, both in 2D and in 3D, is output to the block 220 for camera radar fusion and to the block 234 for the display driver. In an embodiment, the block 234 is performed by an IPU, for example by the same IPU that implements the block 172. In an embodiment, the camera radar fusion is performed on the same DSP as the block 224 and the block 208.

In the block 194, vision motion estimation is performed on the video data from the block 172. In one embodiment, the block 194 is performed by the same DSP as the block 208, the block 224, and the block 220. The DSP performs a processing chain for vision motion estimation on the image plane. The vision motion estimation operates on the vision plane. Also, the vision motion estimation may perform various aspects of optical flow, including Gaussian pyramid generation, motion visualization, Harris feature extraction in the block 184 (FIG. 6), POI selection and LK motion estimation. The outputs from the block 194, which are vectors, are output to the block 220 for camera radar fusion.

The video data from the block 172 is also output the block 178 for image processing. The block 178 performs the feature plane extraction the noise filter and resizing.

The processed image data from the block 178 is output to the block 214 for image recognition. In an embodiment, the image recognition is performed by a DSP, for example by a dedicated DSP. The DSP performs object classification and object tracking. The visual object classification data, output from the block 214, is sent to the block 220 for camera radar fusion. Additionally, the visual object classification data is sent to the 234 for the display driver.

The block 220 performs camera radar fusion, including 3D velocity synthesis and simultaneous 2D and 3D object tracking. In an embodiment, the block 220 is performed by the same DSP as the block 224, the block 208, and the block 194.

The block 232 is for fusion visualizing the data output from the block 220. In an embodiment, the block 232 is performed by an IPU, for example by a dedicated IPU. The fusion visualization includes radar drawing, fusion drawing, and real-time SoC loading. In an example, the fusion visualization produces fusion visualization data.

In the block 234, the display driver displays the data from the 214, from the block 224, and from the block 230. A user may view the radar data, the video data, and the fusion data, including the real time SoC loading. The user may utilize this data to assist in driving. The various data aspects may also be output to other systems, for example ADAS control systems. The ADAS control system may use the camera radar fusion data for various ADAS functions, such as collision avoidance, lane change assistance, adaptive cruise control, traffic jam assistance, blind spot monitoring, and other applications, such as parking assistance.

Figure 5:
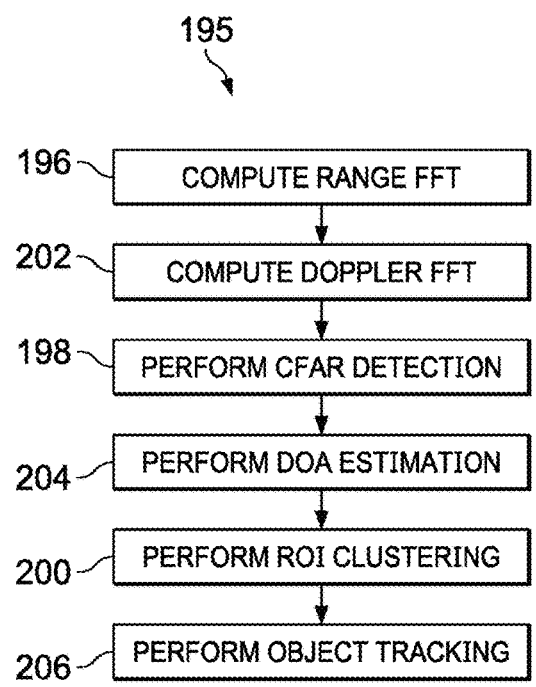
FIG. 5 illustrates a flowchart for an example method of radar signal processing.

FIG. 5 illustrates the flowchart 195 for an embodiment method of performing radar signal processing in a camera radar fusion system. For example, the flowchart 195 may be performed as part of the block 208 in FIG. 4. In one embodiment, the flowchart 195 is performed a DSP.

In the block 196, the DSP computes the range FFT for objects based on the radar data. The radar sensor transmits a millimeter wave signal, and captures the reflections off of objects. An embodiment radar sensor transmits a FMCW radar signal. In FMCW radar, a frequency-modulated radar signal is continuously transmitted, for measurement range, angle, and velocity. In a FMCW radar, the frequency increases linearly with time. This signal is known as a chirp. The chirp signal is characterized by a start frequency, a bandwidth, and a duration. Additionally, the slope of the chirp indicates the rate of change of frequency. An object reflects the chirp, which is received by a receive antenna of the radar sensor. A mixer of the radar sensor combines the receive and transmit signals, to produce an intermediate frequency (IF) signal, which has a constant frequency. Additionally, the initial phase of the IF signal is the difference between the phase of the transmitted chirp and the phase of the received chirp at the time of the start of the IF signal. The IF signal is given by:

$$IF = A \sin(2\pi f_o t + \phi_o),$$

where A is the amplitude, $f_o$ is the carrier frequency, t is the time, and $\phi_o$ is the difference between the phase of the transmitted chirp and the phase of the received chirp. The carrier frequency is given by:

$$f_o = \frac{S2d}{c},$$

where S is the slope of the chirp, d is the distance to the object, and c is the speed of light. Additionally the value of $\phi_o$ is given by:

$$\phi_o = \frac{4\pi d}{\lambda},$$

where d is the distance to the object and $\lambda$ is the wavelength. When there are multiple objects, there will be multiple reflected signals from the different objects at different differences.

The IF signal is converted from an analog signal to a digital signal by an ADC. Then, pre-processing, such as zero padding and bit extension, is performed. After the pre-processing, an FFT is performed on the IF signal, resulting in a frequency spectrum with separate peaks corresponding to the different objects. These peaks are then detected, and the peaks represent objects in the field of the radar. Additionally, transposed result write back is performed.

In the block 202, the DSP computes the Doppler FFT over multiple chirps. To measure the velocity, multiple chirps are emitted. The reflected chirps are processed by performing the range FFT in the block 196. The range FFT corresponding to each chirp has peaks in the same locations, but with different phases. The phase difference corresponds to a motion of the object. The phase difference is given by:

$$\Delta\Phi = \frac{4\pi v T_c}{\lambda},$$

where v is the velocity, $T_c$ is time spacing between chirps, and $\lambda$ indicates wavelength. Accordingly, the velocity is given by:

$$v = \frac{\lambda \Delta\Phi}{4\pi T_c}.$$

The velocity is obtained by taking the FFT over multiple chirps, i.e. by computing the Doppler FFT. The Doppler FFT is performed over N phasors, where N is the number of chirps, and N is an integer greater than 2.

In the block 198, the DSP performs CFAR detection. CFAR detection is a form of adaptive algorithm that detects object returns against a background of noise, clutter, and interference. In CFAR detection, the returned power is compared to a threshold. When the returned power is above a threshold, the reflection indicates an object, and when the returned power is below the threshold, the reflection indicates a false alarm. A lower threshold increase the false alarm rate while decreasing the rate of missed objects, while a higher threshold decreases the false alarm rate while missing objects. In CFAR detection, the threshold is dynamically adjusted to maintain a constant probability of false alarms in fields with varying noise levels. In an embodiment, the threshold level is calculated by estimating the level of the noise floor around the cell under test (CUT). The CUT may be found by taking a block of cells around the CUT and calculating the average power level. Cells immediately adjacent to the CUT, known as guard cells, are ignored, to avoid corrupting the estimate with power from the CUT itself. An object is determined to be present in the CUT when it is both greater than all of its adjacent cells and greater than the local average power level. In another embodiment, separate averages are calculated for the cells to the level and to the right of the CUT. Then, the greatest-of or least-of these two power levels is used to define the local power level.

Additionally, in the block 204, the DSP performs DOA estimation. The direction of the arrival, or the angle of arrival (AoA), is determined relative to the horizontal plane. Angular estimation is based on the fact that a small change in the distance of an object results in a phase change in the peak of the range FFT calculated in the block 196 or the Doppler FFT calculated in the block 202. The DSP determines angular estimation using at least two receive antennas. The differential distance from the object to each of the antennas leads to a phase change in the FFT peak. The phase change is given by:

$$\Delta\Phi = \frac{2\pi \Delta d}{\lambda},$$

where $\Delta d$ is the difference in the distance obtained by two receive antennas and $\lambda$ is the wavelength. Assuming a planar wavefront geometry, the difference in distance is:

$$\Delta d = l \sin(\theta),$$

where l is the distance between the antennas and θ is the angle. Accordingly, the angle is:

$$\theta = \sin^{-1}\left(\frac{\lambda\Delta\Phi}{2\pi l}\right).$$

For a small value of θ, sin (θ)~θ. Under the small angle estimation:

$$\theta = \frac{\lambda\Delta\Phi}{2\pi l}.$$

Additionally, range gating may be applied to remove noisy range bins, for example closer than 50 cm.

In the block 200, ROI clustering is performed. A detection point cloud is clustered into a dynamic number of ROIs. An ROI may indicate a particular object. In an embodiment, the normalized cuts and image segmentation algorithm based on normalized cut theory is used for cluster tracking. The azimuth angle is used to form a cluster of the ROI. In image segmentation, the image is partitioned into multiple regions according to a criterion. The set of points in a feature space are represented as a weighted undirected complete graph, where the nodes of the graph are the points in the feature space. The weight of an edge is a function of the similarity between the nodes it connects. An ROI includes vertices with high similarity, and vertices in different ROIs have low similarity. Normalized cuts are used to separate the radar image into ROIs. Pre-ROI processing may also be performed. Additionally, velocity filtering may be performed.

In the block 206, object tracking is performed. Temporal and spatial filters are applied to accumulated ROI records, from the block 200, to reduce noise, due to both false alarms and missed detection, and to alleviate multi-path ghosts. Then, object typing is performed on individual ROI clusters.

Figure 6:
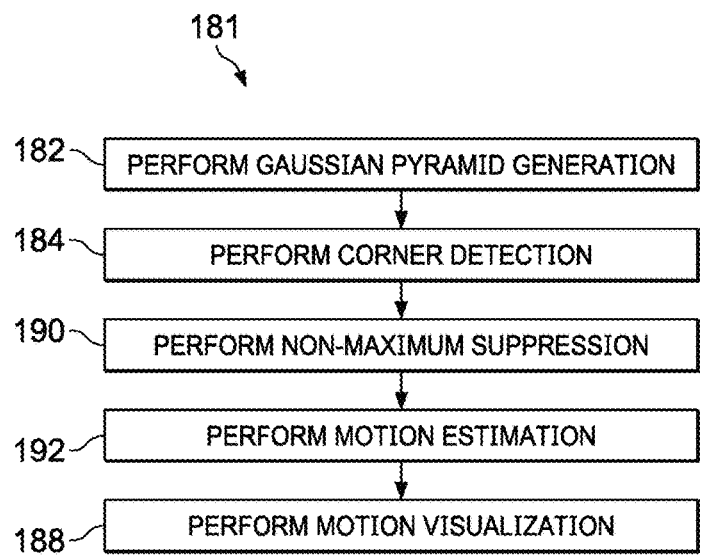
FIG. 6 illustrates a flowchart for an example method of vision motion estimation.

FIG. 6 illustrates the flowchart 181 for an embodiment method of performing vision motion estimation in a camera radar fusion system. In an example, the flowchart 181 may be performed in the block 194 in FIG. 4. In one embodiment, the vision motion estimation is performed on a DSP, for example by the same DSP that performs the radar signal processing.

Figure 7:
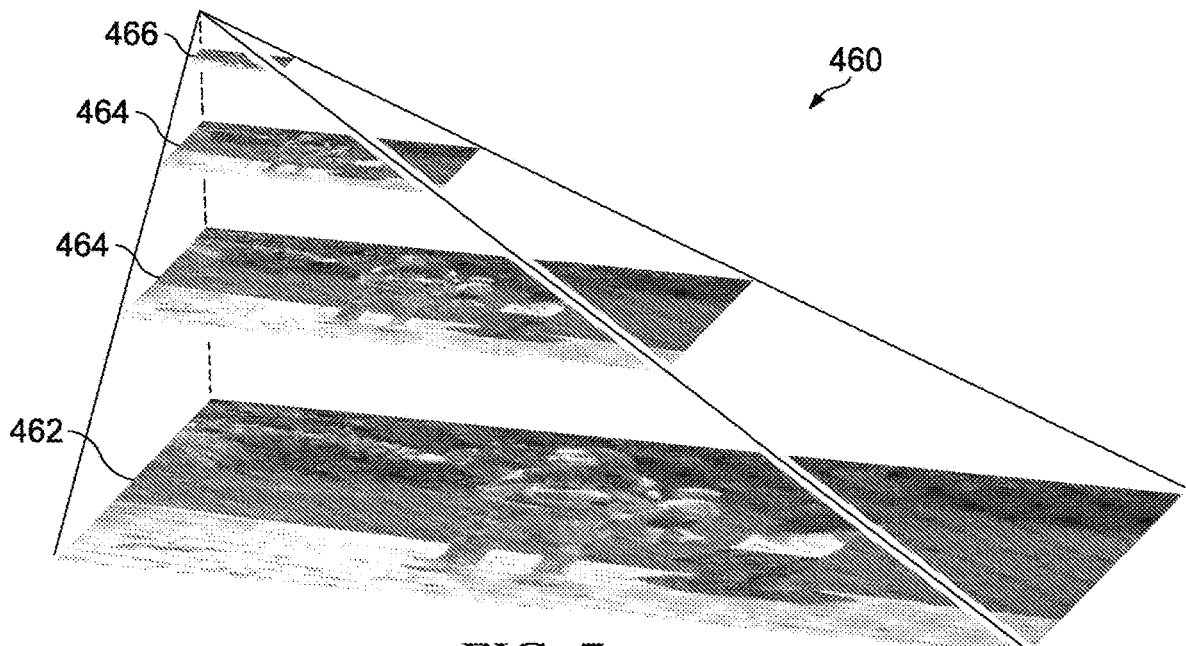
FIG. 7 illustrates an example Gaussian pyramid.

In the block 182, the DSP performs Gaussian pyramid generation. The image is subject to repeated smoothing and subsampling. A pyramid representation is a type of multi-scale signal representation, in which the image is subject to repeated smoothing and subsampling. Using a low pass pyramid, the image is smoothed and subsampled, for example by a factor of two along each coordinate direction. This cycle of smoothing and subsampling is repeated, increasing smoothing and decreasing resolution. FIG. 7 illustrates an embodiment Gaussian pyramid 460, where the image 462 is the initial image, the images 464 are intermediate images, and the image 466 is the final image. In the image 466, the pixels contain a local average that corresponds to a pixel neighborhood on a lower level of the pyramid. In other embodiments, other types of pyramids, such as Laplacian pyramids or steerable pyramids, may be used.

In the block 184, the DSP performs corner detection using Harris feature extraction. Corner detection is used to perform motion detection on the images in the pyramid generated in the block 182. A corner, interest point, or feature is defined as the intersection of two edges or as a point which has two dominant and different edge directions in a local neighborhood of the point. Harris feature extraction utilizes the Harris matrix to detect corners. In other embodiments, different methods of corner detection, such as Moravec corner detection, the level curve curvature approach, Laplacian of Gaussian, scale-space interest points based on the Lindeberg Hessian feature strength measures, Affine-adapted interest point operators, the Wang and Brady corner detection algorithm, the smallest univalue segment assimilating nucleus (SUSAN) corner detector, the Trajkovic and Hedley corner detector, accelerated segment test (AST) based feature detection, or automatic synthesis of detectors, are performed.

In the block 190, non-maximum suppression is performed on the features extracted in the block 184. Non-maximum suppression is used to reduce the number of pixels submitted for processing in the block 192 by selecting pixels with the strongest feature strength in their vicinity, for example a neighborhood patch. In an embodiment, a pixel with the largest Harris score, received in the block 184, within an image patch is selected as the candidate POI of this patch. The POIs may indicate the locations of interest objects, such as a pedestrian, an animal, a car, debris, or other interesting features. In some embodiments, other evaluation metrics regarding feature strength and methods of non-maximum suppression are used.

In the block 192, the DSP performs motion estimation, for example block based motion estimation. In an orthogonal search algorithm, a step size is selected, for example half the maximum displacement in the search window. Two points, received from the block 190, at a distance of the step size in the horizontal direction from the center of the search window are selected. Then, the center is moved to the point of minimum distortion. Using the updated center, points at a distance of the step size from the center in the vertical direction are selected, and the point of minimum distortion is selected as the new center. This process is repeated, halving the step size, until the sept size is less than one. In one embodiment, the motion estimation is Lucas-Kanade motion estimation. Lucas-Kanade motion estimation, a method for optical flow estimation, assumes that the flow is essentially constant in a local neighborhood of the pixel under consideration. The Lucas-Kande motion estimation solves the basic optical flow equations for all pixels in the neighborhood using the least squares criterion. By combining information from several nearby pixels, the Lucas-Kanade method can resolve the ambiguity of the optical flow equation. The Lucas-Kanade method assumes that the displacement of the image contents between two nearby frames is small and approximately constant within a neighborhood of the point under consideration. Accordingly, the optical flow equation is assumed to hold for pixels within a window centered at the point under consideration.

In the block 188, the DSP performs motion visualization. In an embodiment, the pixel in which motion is detected is color coded according to its motion vector for visualization, where the angle and magnitude of the motion vector determine the hue and saturation of the pixel color, respectively. Motion visualization may be performed independently of the other blocks in the flowchart 181.

Figure 8:
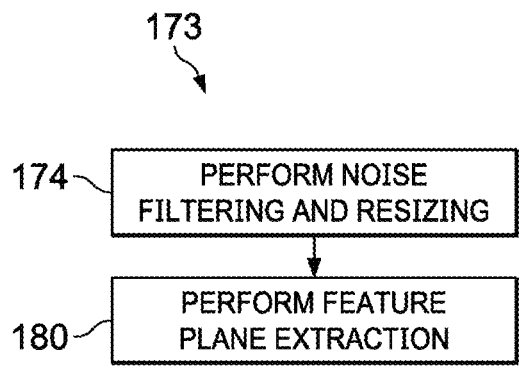
FIG. 8 illustrates a flowchart of an example method of image processing.

The FIG. 8 illustrates the flowchart 173 for an embodiment method of performing image processing. In an embodiment, the flowchart 173 is an example of the block 178 in FIG. 4. In the block 174, a processor performs noise filter and resizing, on the captured image to construct a 17 layer image period. In an embodiment, a VPE or an ISP performs the noise filtering and resizing in the block 174. Nonlinear filtering, such as median filtering, may be performed. In some embodiments, other rank-selection filters, such as rank-conditioned rank-selection (RCRS) filtering, is performed. Other noise reduction methods, such as wavelet transforms, linear smoothing filters, anisotropic diffusion, non-local means, and statistical methods may be performed by the processor.

In the block 180, a processor performs feature plane extraction, for example oriented gradient feature extraction using neural networks to identify objects. The block 180 may be performed at the same time as the block 174. In one embodiment, the processor performing the block 180 is an EVE. A 10 channel descriptor is used, which is composed of Y, Cr, Cr, gradient magnitude, and six oriented gradient magnitudes at 0, 30, 60, 90, 120, and 150 degrees.

Figure 9:
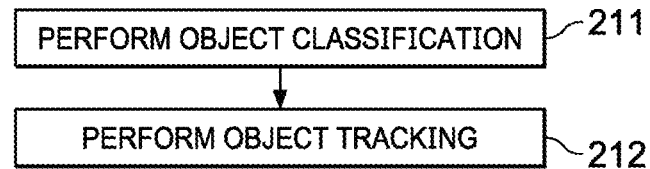
FIG. 9 illustrates a flowchart of an example method of image recognition.

FIG. 9 illustrates the flowchart 210 for an embodiment method of image recognition. In an embodiment, the flowchart 210 is an example of the block 214 of FIG. 4. In an embodiment, the method illustrated by the flowchart 210 is performed by a DSP, for example by a dedicated DSP. In the block 211, the DSP performs object classification for example by using a neural network. In the neural network, one embodiment includes establishing regression models by building decision trees. Object classification is performed by feeding features to a reasoning forest of 1280 decision trees. There are 4 channels representing Cr, Cb, Y, and a gradient magnitude. Also, in the image plane, there are six channels for oriented gradient magnitude. This leads to a total of 10 channels. There is a value descriptor of 128, which is multiplied by 10 channels, to obtain the 1280 decision trees. A decision tree contains a node at level 0 and branches at level 1, and leaves at level 2. The nodes have two or more branches, and the leaf nodes represent a classification or decision. Then, the DSP evaluates, using the decision trees, whether an accumulated response is greater than a threshold, classifying the object.

In the block 212, the DSP performs object tracking, for example Kalman tracking, on recognized objects across consecutive frames. The DSP determines visual object classification data, for example bounding 214es for the objects being tracked. In Kalman tracking, an optimal recursive Bayesian filter is used, for linear functions subjected to Gaussian noise. The DSP uses a series of measurements observed over time, containing noise and other inaccuracies, to produce estimates of unknown variables that are more precise than estimates based on a single measurement. Bayesian interference is used, and a joint probability distribution over the variables for each timeframe is estimated by the DSP. In the prediction step, the Kalman filter produces estimates of the current state of variables and the uncertainties of these variables. After the outcome of the next measurement is observed, the estimates are updated using a weighted average, with more weight given to estimates with higher certainty. This is performed recursively. In some examples, other tracking methods, such a particle filter method, is performed.

Figure 10:
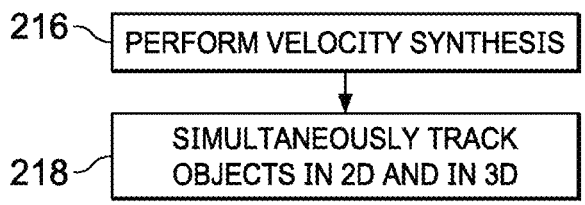
FIG. 10 illustrates a flowchart of an additional example method of camera radar fusion.

FIG. 10 illustrates the flowchart 215 for an embodiment method of performing camera radar fusion. In an embodiment, the method illustrated in the flowchart 215 is an example of the method performed in the block 220 of FIG. 4. The method illustrated by the flowchart 215 may be performed by the same DSP as the camera radar alignment, the radar signal processing, and the motion estimation. In the block 216, the DSP performs velocity synthesis. Data from the radar sensor and from the video camera is used to determine the 3D velocity of objects.

In the block 218, the DSP simultaneously tracks objects in 2D space and in 3D space. The objects are modeled in 3D space using a six-parameter kinematic model and the objects are modeled on the 2D image plane as a bounding area. In the camera radar fusion framework, the two models corresponding to each individual object match each other at all times, using coupled model updating. When a new radar ROI is detected in the 3D space, the objects are updated in both the 3D space and in the 2D space. Likewise, when an object is detected or optical flow motion is detected in 2D space, the relevant object is updated in both 2D space and in 3D space.

Figure 11:
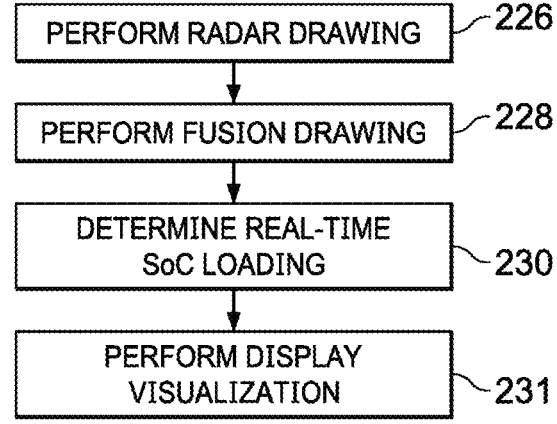
FIG. 11 illustrates a flowchart of an example method of camera radar fusion visualization.

FIG. 11 illustrates the flowchart 225 for an embodiment method of fusion visualization. In an embodiment, the flowchart 225 illustrates a method performed by the block 232 in FIG. 4. The method performed by the flowchart 225 may be performed by one or more than one IPU. In one embodiment, the blocks 226, 228, and 230 are performed by one IPU, and the block 231 is performed by another IPU, for example the same IPU used for sensor data capture. In the block 226, the IPU performs radar drawing. A visual field, for example with a radar generated bounding box illustrating an object, is generated.

In the block 228, the IPU performs fusion drawing. Objects tracking based fusion using the video data and the radar data are identified in a visual field.

In the block 230, the IPU performs real-time SoC load visualization. A graph indicating the SoC load of the various processing devices is generated.

In the block 231, the various visualizations are displayed. The display may show a radar only visualization, a video camera only visualization, the radar drawing results generated in the block 226, the fusion drawing results generated in the block 228, and the real-time SoC load generated in the block 230. The results are displayed, for example, to a driver of a vehicle, or to another user. The various data aspects may also be output to other systems, for example other systems in an ADAS.

Figure 12:
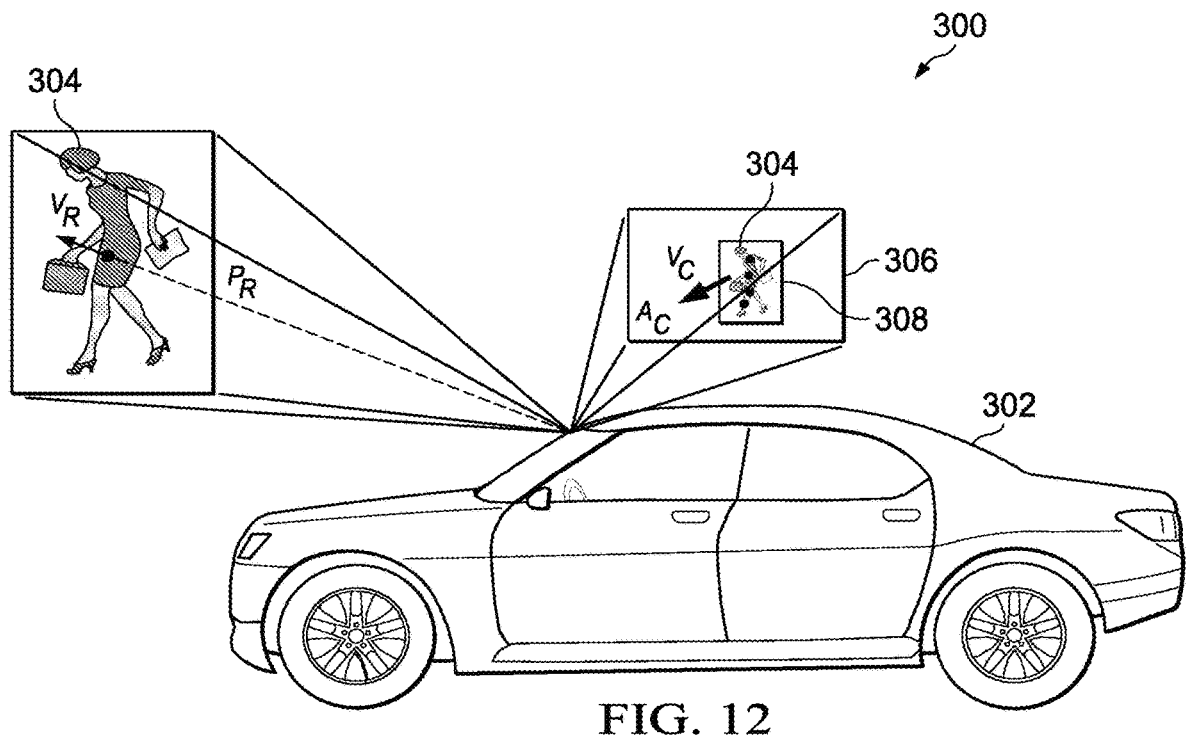
FIG. 12 illustrates an example scenario for camera radar fusion.

Objects are simultaneously tracked in the 2D image plane and in the 3D physical space. FIG. 12 illustrates the scenario 300, in which the vehicle 302 contains radar sensors and video cameras for observing the environment. The radar sensors sense the person 304 in 3D, determining a range of $P_R$ and a velocity in the radial direction $V_R$. The video camera obtains the 2D image plane 306. The bounding box 308 surrounds the person 304, determining the position in the image plan. The camera also the velocity $V_C$ and angle $A_C$ of the person 304 in the image plane.

Figure 13:
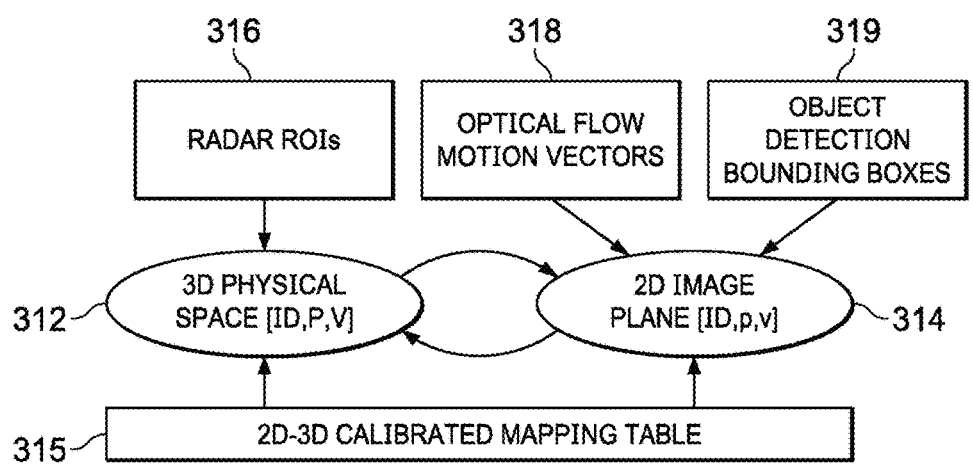
FIG. 13 illustrates a flowchart for an example method of simultaneous two dimensional (2D) and three dimensional (3D) object tracking for camera radar fusion.

The FIG. 13 illustrates simultaneous object tracking in the 2D image plane kinematic model 314 and in the 3D physical space kinematic model 314. Objects are simultaneously tracked in a 3D physical space kinematic model 312, with the variables [ID, P, V] and in the 2D image plane kinematic model 314, with the variables [ID, p, v], where ID is an identifier for the object, P is a three dimensional position vector for the object, V is a three dimensional velocity of the object, p is the two dimensional position vector for the object in the image plane, and v is the two dimensional velocity vector for the object in the image plane. The 2D image plane kinematic model 314 and the 3D physical space kinematic model 314 both maintain a timestamp based on a global system time reference. Updates for the 3D physical space kinematic model 312 and the 2D image plane kinematic model 314 are coupled, and an update in one kinematic model leads to an update in the other kinematic model. Detection of a new or updated radar object detection data, for example radar ROI 316, triggers updating of the object in the 3D physical space kinematic model 312. The model in the 2D image plane kinematic model 314 may be immediately and/or automatically updated in response to the latest state of the objects in the 3D space based on the 2D-3D calibrated mapping table 315. The 2D-3D calibrated mapping table 315 is calibrated in advance. Similarly, when a new optical flow motion vector 318 or a new object detection bounding boxes 319, for example visual object classification data is acquired, the 2D image plane kinematic model 314 is triggered to update the object model. The 3D physical space kinematic model 312 may be immediately and/or automatically updated according to the latest state of the objects in the 2D image plane kinematic model 314 using the 2D-3D calibrated mapping table 315. The 2D-3D calibrated mapping table 315 is a look-up table that provides a mapping between the 3D physical space kinematic model 312 and the 2D image plane kinematic model 314.

In an example, the 2D image plane kinematic model 314 receives an optical flow motion vector 318. The 2D image plane kinematic model is then updated based on the received optical flow motion vector, with values [ID, p', v']. The 2D image plane kinematic model updates the [ID, p, v] coordinates corresponding to the received optical flow vector, to generate [ID, p', v'], where p' is the updated position of the object ID and v' is the updated 2D velocity vector for the object ID. Also, the 2D-3D calibrated mapping table 315 transforms the [ID, p, v] coordinates from two dimensions to three dimensions, to generate the [ID, P', V'] coordinates, where P' is the updated 3D position of object ID and V' is the 3D velocity vector of object ID. When the 3D physical space kinematic model 312 is tracking the object ID as [ID, P, V], the kinematic model updates the values of [ID, P, V] to [ID, P', V'] based on the received update. On the other hand, when the 3D physical space kinematic model 312 does not already contain an object ID, it creates an object ID with coordinates [ID, P', V'].

In another example, the 3D physical space kinematic model 312 receives updated radar ROI 316 with coordinates [ID, P', V']. The 3D physical space kinematic model 312 is updated based on these coordinates. When the 3D physical space kinematic model 312 already has an object ID at coordinates [ID, P, V], it updates the object to the coordinates [ID, P', v']. On the other hand, when the 3D physical space does not already have the object ID, it adds the object with the coordinates [ID, P', V']. Also, the 2D-3D calibrated mapping table 315 transforms the coordinates [ID, P', V'] to [ID, p', v'] in the 2D image plane kinematic model 314. When the 2D image plane kinematic model 314 already has an object ID at coordinates [ID, p, v], it updates the coordinates to [ID, p', v']. On the other hand, when the 2D image plane kinematic model does not already have the object ID, it adds the object with the coordinates [ID, p', v'].

In an additional example, the 2D image plane kinematic model 314 receives an object detection bounding boxes 319, a type of visual object classification data. The 2D image plane kinematic model is then updated based on the visual object classification data, with values [ID, p', v']. The 2D image plane kinematic model adds the object ID with the coordinates [ID, p', v'] to the model. Also, the 2D-3D calibrated mapping table 315 transforms the [ID, p, v] coordinates from two dimensions to three dimensions, to generate the [ID, P', V'] coordinates, where P' is the updated 3D position of object ID and V' is the 3D velocity vector of object ID. When the 3D physical space kinematic model 312 is tracking the object ID as [ID, P, V], the kinematic model updates the values of [ID, P, V] to [ID, P', V'] based on the received update. On the other hand, when the 3D physical space kinematic model 312 does not already contain an object ID, it creates an object ID with coordinates [ID, P', V'].

For model propagation and updating, an uncertainty-driven mechanism similar to Kalman filtering is applied to balance the use of sensing results with diverse qualities.

Figure 14:
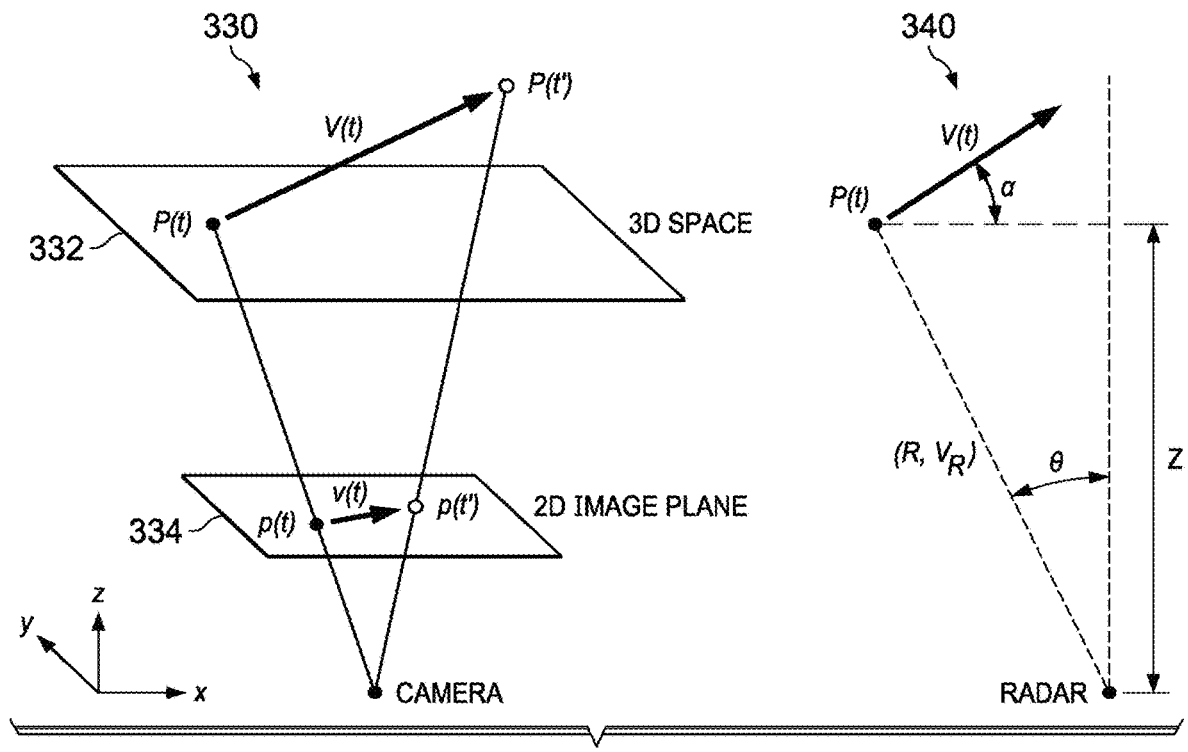
FIG. 14 illustrates example 3D velocity synthesis for camera radar fusion.

In an embodiment, the 3D velocity associated with each object is determined using the radar data and the video data. FIG. 14 illustrates velocity synthesis with the camera view 330 and the radar view 340. In the 2D image plane 334, $v(t)=[v_x, v_y, 0]$ is the velocity, $p(t)=[x, y, f]$, and $p(t')=[x'y', f']$, where f is the foal length and $[v_x, v_y]$ is the velocity flow vector. In the 3D physical space, $V(t)=[V_x, V_y, V_z]$ is the velocity, $P(t)=[X, Y, Z]$ is the position, and $P(t')=[X', Y', Z']$. In the radar view 340, P(t) and V(t) are the same as they are in the camera view 330. Also, R is the range obtained using the radar, $V_R$ is the velocity in the radial direction. Additionally θ is the angle of the position with respect to the y-z axis and α is the angle of the velocity with respect to the x-z axis, where θ and α are independent of each other. Z may be determined by $Z=R \cos(\theta)$. In an embodiment, θ is obtained jointly from the radar DOA estimation and the angle calculation on the image plane using arcan2 (x, f). Accordingly, due to geometric rules:

$$p = P \cdot f \cdot Z^{-1} \Rightarrow v = \frac{\partial p}{\partial t} = (f \cdot Z^{-2})(Z \cdot V - V_z \cdot P).$$

This equation can be transformed into:

$$V_x = (v_x \cdot Z + V_z \cdot x) \cdot f^{-1},$$

$$V_y = (v_y \cdot Z + V_z \cdot y) \cdot f^{-1},$$

where x, y, $v_x$, and $v_y$ are known from the video camera (and from sparse optical flow) and Z is determined based on the radar output. The radar sensed velocity can be determined by solving for $V_x$, $V_y$, and $V_z$ using:

$$V_z = |V(t)| \cdot \sin(\alpha),$$

$$V_R = |V(t)| \cdot \cos(\pi/2 + \theta - \alpha) = |V(t)| \cdot \sin(\alpha - \theta), \text{ and}$$

$$|V(t)|^2 = V_x^2 + V_y^2 + V_z^2.$$

Then, the 3D velocity:

$$V(t) = [V_x, V_y, V_z]$$

is solved using analytical or numerical methods.

Figure 15:
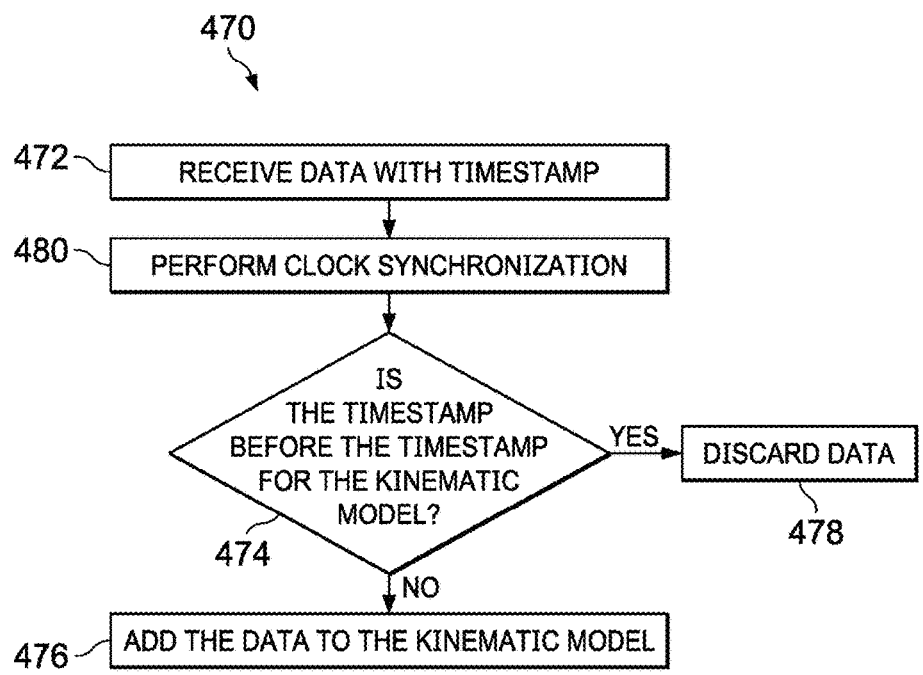
FIG. 15 illustrates a flowchart of an example method of time synchronization for camera radar fusion.

FIG. 15 illustrates the flowchart 470 for an embodiment method for time synchronization for camera radar fusion. In an embodiment, the method illustrated by the flowchart 470 is performed by a DSP. In the block 472, the DSP receives data with an associated timestamp. The data may be video data or with radar data. Processing may have been performed on the data. The timestamp may account for the time of acquisition and the time for processing.

In the block 480, the DSP performs clock synchronization. The local timestamp on the data is converted to a global timestamp by modeling the frequency difference between data from various local clocks. Offsets between the individual local clock and the global system time reference are determined by the DSP. Then, the local timestamp is converted to a global timestamp.

In the block 474, the DSP determines whether the timestamp associated with the data is before a timestamp of the kinematic model. When the timestamp for the data is not before the timestamp of the kinematic model, the data is sufficiently recent, and the DSP proceeds to the block 476 and adds the data to the kinematic model. On the other hand, when the timestamp for the data is before the timestamp of the kinematic model, the data is out-of-date, and the camera radar fusion block proceeds to the block 478. In the block 478, the camera radar fusion block discards the data.

In some embodiments, multiple video cameras and multiple radar sensors are used, to enable a view of a wider area. For example, 4-6 radar sensors and 4-6 video cameras are used. In an embodiment, the same number of radar sensors and video cameras are used. Alternatively, a different number of radar sensors and video cameras are used.

In other embodiments, camera radar fusion occurs in a lower level, for example using domain algorithms with raw data fusion. In another embodiment, camera radar fusion occurs throughout the stack with optimized sensor operation. For example, the radar and video camera operation profiles vary dynamically according to real-time needs and constraints.

Although the invention has been described in detail, it should be understood that various changes, substitutions and alterations can be made thereto without departing from the spirit and scope of the invention as defined by the appended claims.

What is claimed is:

1. A method comprising:
   receiving, by a processor, video data;
   performing, by the processor, image processing, filtering, and object classification and tracking based on the video data to generate visual object classification data;
   performing, by the processor, visual motion estimation on the video data to generate a vision motion estimation vector;
   receiving, by the processor, radar data;
   performing, by the processor, radar signal processing on the radar data to generate processed radar object detection data;
   performing, by the processor, camera radar alignment on the radar data to generate aligned radar object detection data; and
   performing, by the processor, camera radar fusion on the aligned radar object detection data, the vision motion estimation vector, and the visual object classification data to generate camera radar fusion data.

2. The method of claim 1, wherein performing the camera radar fusion comprises:
   modeling a two-dimensional (2D) image plane kinematic model by at least updating 2D object coordinates based on the vision motion estimation vector to generate updated 2D object coordinates;
   transforming the updated 2D object coordinates to generate updated three-dimensional (3D)) object coordinates based on a 2D-3D calibrated mapping table; and
   modeling a 3D physical space kinematic model by at least updating the object coordinates based on the updated 3D object coordinates.

3. The method of claim 2, wherein updating the object coordinates is performed in response to determining that a first timestamp of the vision motion estimation vector is after a second timestamp of the 2D image plane kinematic model.

4. The method of claim 2, wherein the 2D object coordinates are a first 2D object coordinates, the method further comprising:
   receiving second visual object classification data;
   wherein modeling the 2D image plane kinematic model further comprises adding second 2D object coordinates to the 2D image plane kinematic model in accordance with the second visual object classification data,
   wherein the method further comprises transforming the second 2D object coordinates to generate second 3D object coordinates based on the 2D-3D calibrated mapping table; and
   wherein modeling the 3D physical space kinematic model further comprises adding the second 3D object coordinates to the 3D physical space kinematic model.

5. The method of claim 4, wherein adding the second 2D object coordinates to the 2D image plane kinematic model is performed in response to determining that a first timestamp of the radar data is after a second timestamp of the 2D image plane kinematic model.

6. The method of claim 2, wherein updating 3D object coordinates is performed in response to determining that a first timestamp of the radar data is after a second timestamp of the 3D physical space kinematic model.

7. The method of claim 1, wherein the processor is a digital signal processor (DSP).

8. The method of claim 1, further comprising:
   determining, by the processor, a 2D object position based on the vision motion estimation vector and based on the visual object classification data;
   determining, by the processor, a 2D object velocity based on the vision motion estimation vector and based on the visual object classification data;
   determining, by the processor, a 3D object position based on the radar data; and
   determining, by the processor, a 3D object velocity based on the 2D object position, the 2D object velocity, a video camera focal length, and the 3D object position.

9. The method of claim 8, wherein determining the 3D position comprises solving:

$$V_x = (v_x \cdot Z + V_z \cdot x) \cdot f^{-1};$$

$$V_R = |V(t)| \cdot \sin(\alpha - \theta);$$

$$V_y = (v_y \cdot Z + V_z \cdot y) \cdot f^{-1}; \text{ and}$$

$$V_z = |V(t)| \cdot \sin(\alpha);$$

wherein:

$$|V(t)|^2 = V_x^2 + V_y^2 + V_z^2;$$

[$V_x$, $V_y$, $V_z$] is a 3D object velocity vector;
[X, Y, Z] is a 3D object position vector;
[$v_x$, $v_y$, 0] is a 2D object velocity vector; and
[x, y, f] is a 2D object position vector, and wherein f is the video camera focal length.

10. A system-on-a-chip (SoC) comprising one or more processors configured to:
    receive radar data;
    in response to receiving the radar data, model a three dimensional (3D) physical space kinematic model comprising a 3D set of variables comprising 3D object coordinates and an object identifier, by at least updating the 3D object coordinates to generate updated 3D object coordinates;
    transform the updated 3D object coordinates to updated two dimensional (2D) object coordinates, based on a 2D-3D calibrated mapping table; and
    model a 2D image plane kinematic model comprising a 2D set of variables comprising 2D object coordinates and the object identifier, while modeling the 3D physical space kinematic model, wherein modeling the 2D image plane kinematic model comprises updating object coordinates based on the updated 2D object coordinates.

11. The SoC of claim 10, wherein the one or more processors are further configured to:
receive a vision motion estimation vector, wherein to model the 2D image plane kinematic model, the one or more processors are configured to update object coordinates based on the vision motion estimation vector to generate second updated 2D object coordinates; and
transform the second updated 2D object coordinates to generate second updated 3D object coordinates based on the 2D-3D calibrated mapping table,
wherein to model the 3D physical space kinematic model, the one or more processors are configured to update the object coordinates based on the second updated 3D object coordinates.

12. The SoC of claim 11, wherein the one or more processors are further configured to update the object coordinates in response to determining that a first timestamp of the vision motion estimation vector is after a second timestamp of the 2D image plane kinematic model.

13. The SoC of claim 10,
wherein the 2D set of variables is a first 2D set of variables,
wherein the 2D object coordinates are a first 2D object coordinates,
wherein the 3D object coordinates are first 3D object coordinates, and
wherein the one or more processors are further configured to:
receive second visual object classification data, wherein to model the 2D image plane kinematic model, the one or more processors are further configured to add a second set of 2D variables to the 2D image plane kinematic model in accordance with the second visual object classification data, wherein the second set of 2D variables comprises second 2D object coordinates; and
transform the second 2D object coordinates to generate second 3D object coordinates based on the 2D-3D calibrated mapping table,
wherein to model the 3D physical space kinematic model, the one or more processors are further configured to add a second set of 3D variables to the 3D physical space kinematic model.

14. The SoC of claim 13, wherein the one or more processors are further configured to add the second set of 2D variables to the 2D image plane kinematic model in response to determining that a first timestamp of the radar data is after a second timestamp of the 2D image plane kinematic model.

15. The SoC of claim 10, wherein the one or more processors are configured to update the 3D object coordinates in response to determining that a first timestamp of the radar data is after a second timestamp of the 3D physical space kinematic model.

16. The SoC of claim 10, wherein the one or more processors comprise a digital signal processor.

17. A system-on-a-chip (SoC) comprising one or more processors configured to:
receive a vision motion estimation object vector;
receive visual object classification data;
receive radar object detection data;
determine a two dimensional (2D) object position based on the vision motion estimation object vector and based on the visual object classification data;
determine a 2D object velocity based on the vision motion estimation object vector and based on the visual object classification data;
determine a three dimensional (3D) object position based on the radar object detection data; and
determine a 3D object velocity based on the 2D object position, the 2D object velocity, a video camera focal length, and the 3D object position.

18. The SoC of claim 17, wherein to determine the 3D position, the one or more processors are configured to solve:

$$V_x = (v_x \cdot Z + V_z \cdot x) \cdot f^{-1};$$

$$V_R = |V(t)| \cdot \sin(\alpha - \theta);$$

$$V_y = (v_y \cdot Z + V_z \cdot y) \cdot f^{-1}; \text{ and}$$

$$V_z = |V(t)| \cdot \sin(\alpha);$$

wherein:

$$|V(t)|^2 = V_x^2 + V_y^2 + V_z^2;$$

[$V_x$, $V_y$, $V_z$] is a 3D object velocity vector;
[X, Y, Z] is a 3D object position vector;
[$v_x$, $v_y$, 0] is a 2D object velocity vector; and
[x, y, f] is a 2D object position vector, and wherein f is the video camera focal length.

19. The SoC of claim 17, wherein the one or more processors comprise a digital signal processor.

* * * * *